United States Patent

[11] 3,571,847

| [72] | Inventor | Robert Palmai<br>Preston, Ontario, Canada |
|---|---|---|
| [21] | Appl. No. | 752,611 |
| [22] | Filed | Aug. 14, 1968 |
| [45] | Patented | Mar. 23, 1971 |

[54] APPARATUS FOR FORMING PLASTIC FIBER FILTERS
6 Claims, 8 Drawing Figs.

[52] U.S. Cl............................................. 18/5, 18/6
[51] Int. Cl............................................. B29c 3/02
[50] Field of Search................................. 18/5 (E), 4 (C), 4 (P), 6 (E)

[56] References Cited
UNITED STATES PATENTS

| 2,103,860 | 12/1937 | Mazzeo............ | 18/4C |
| 2,732,584 | 1/1956 | Bishop............. | 18/4C |
| 3,078,505 | 2/1963 | Mitten............. | 18/4B |
| 3,214,792 | 11/1965 | Fassina............ | 18/4C |
| 3,334,381 | 8/1967 | Moneymaker et al. | 18/5E |
| 3,382,533 | 5/1968 | Fyfe et al......... | 18/5E |
| 3,390,428 | 2/1968 | Graunke et al..... | 18/5E |

*Primary Examiner*—Frank T. Yost
*Attorney*—Barnes, Kisselle, Raigch & Choate

ABSTRACT: Apparatus for forming plastic fiber filters wherein a formed filter of a dried mat containing uncured resin is transferred to a heated mold and the heated mold is moved in an endless path through a heating chamber to an unloading station.

INVENTOR
ROBERT PALMAI

BY
Barnes, Kisselle, Raisch & Choate
ATTORNEYS

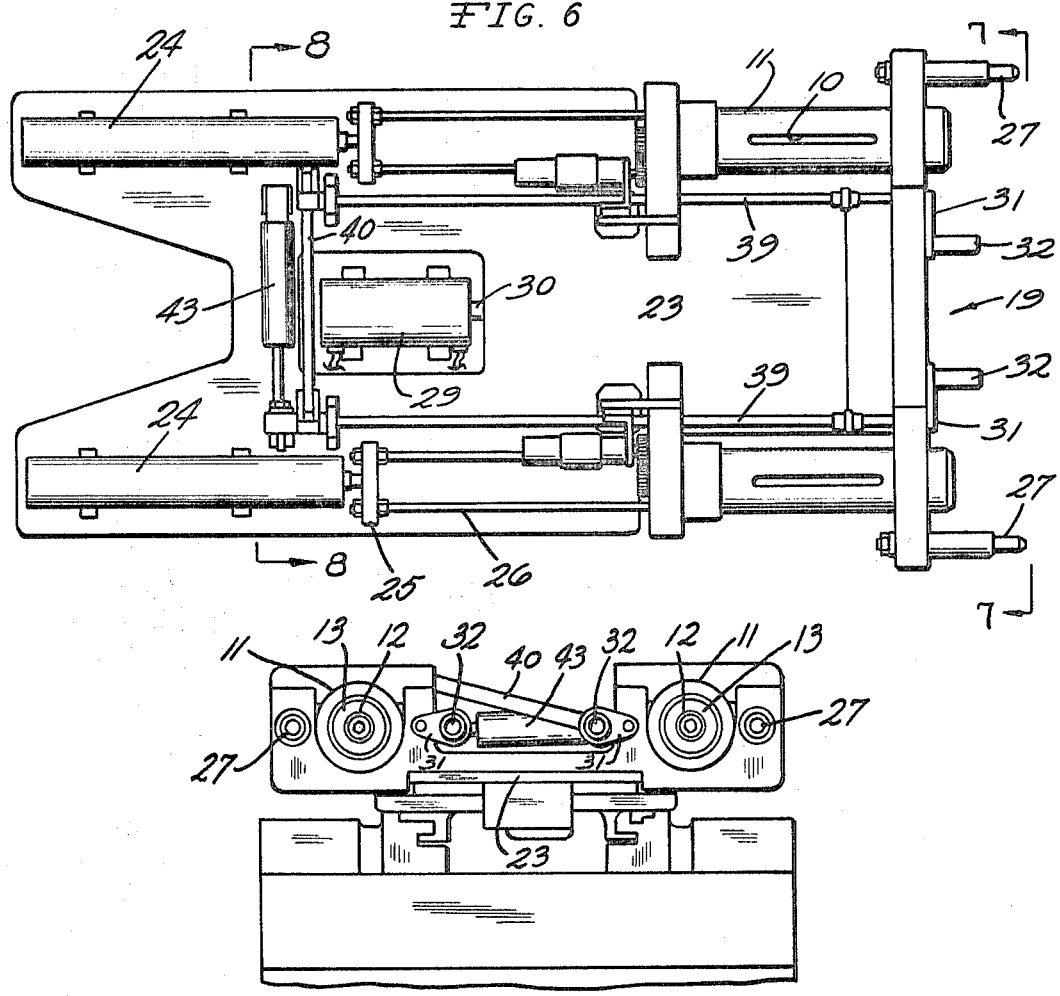
FIG. 6
FIG. 7
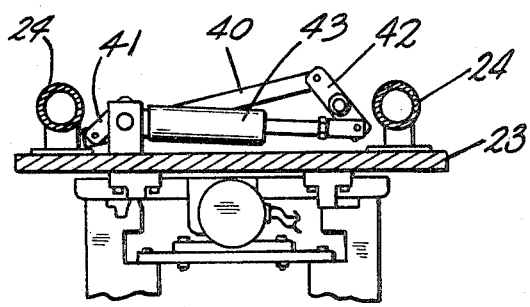
FIG. 8
INVENTOR
ROBERT PALMAI
BY
Barnes, Kisselle, Raisch & Choate
ATTORNEYS

APPARATUS FOR FORMING PLASTIC FIBER FILTERS

This invention relates to the forming of plastic fiber filters.

In my U.S. Pat. No. 3,304,356 issued Feb. 14, 1967, there is disclosed a method of producing filters from a mat of resilient fibrous material by impregnating the mat with a thermosetting resin and drying the mat at a temperature below that at which curing of the resin commences. The dried mat is formed into a filter and transferred into an open-ended heated mold which is closed and heated to cure the resin. As a further step in the method, the pressure on the filter is maintained until the compressed mat takes a permanent set due to the heat; the pressure is thereafter released and the cover is reapplied to recompress the filter to complete the curing of the resin.

Among the objects of the present invention are to provide a method and apparatus which utilizes this aforementioned basic method but more effectively produces filters at a more rapid rate and in a more uniform manner.

In the drawings:

FIG. 6 is a fragmentary plan view of a portion of the apparatus.

FIG. 7 is a fragmentary sectional view taken along the line 7-7 in FIG. 6.

FIG. 8 is a sectional view taken along the line 8-8 in FIG. 6.

Figure 1:
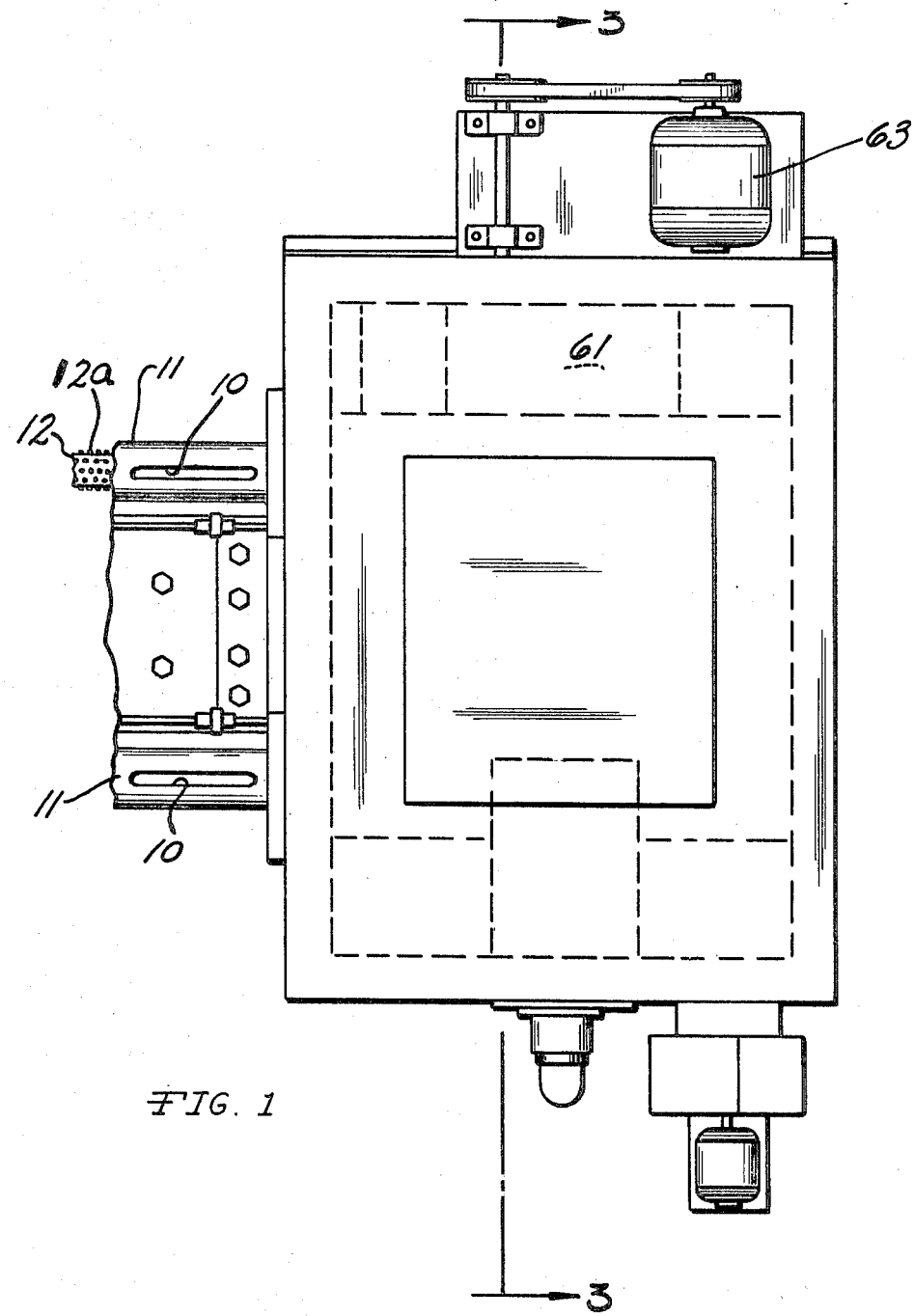
FIG. 1 is a plan view of an apparatus embodying the invention.
Figure 2:
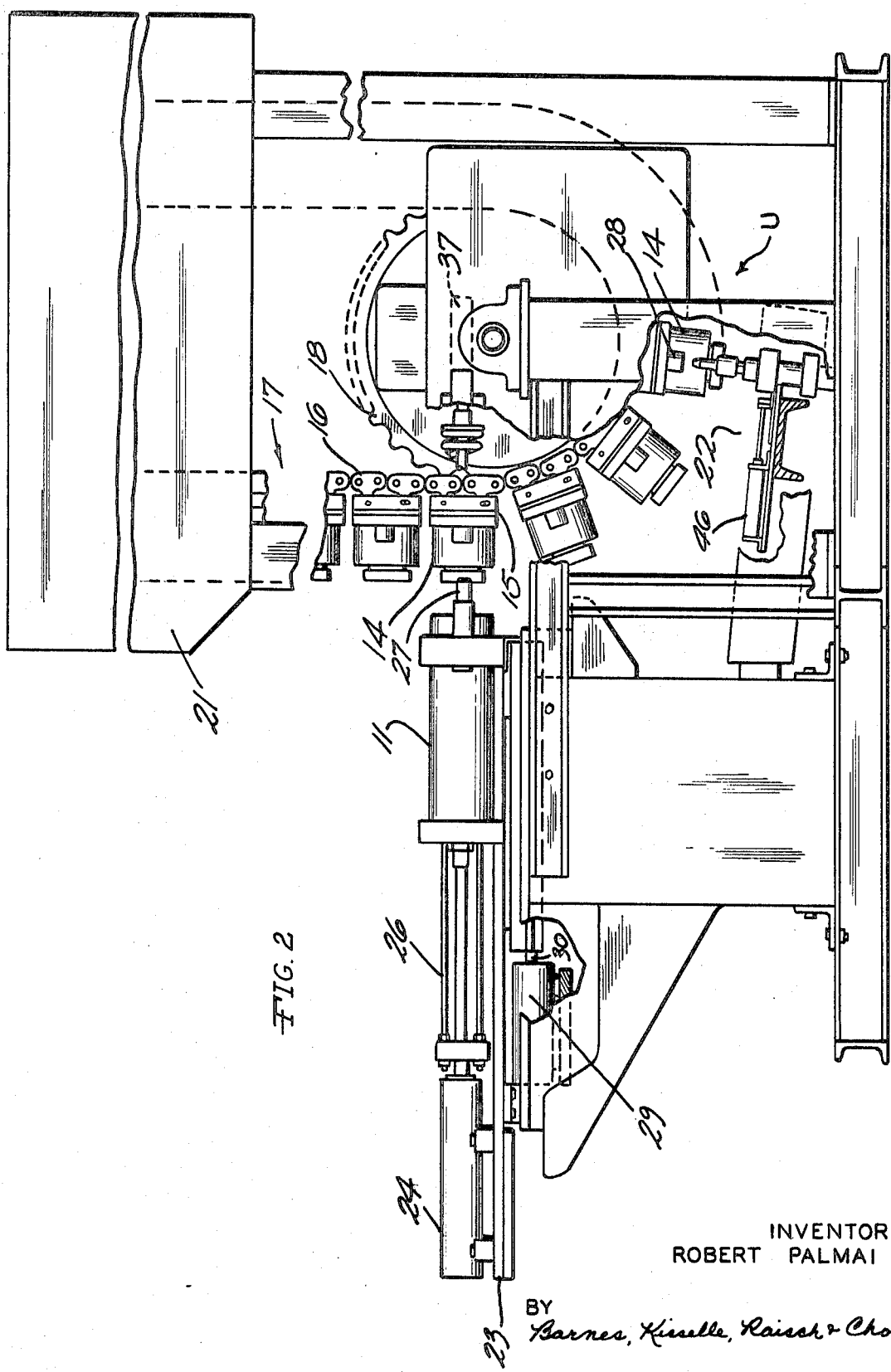
FIG. 2 is a part sectional side elevational view of the apparatus shown in FIG. 1.

Referring to FIGS. 1, 2 and 6, in accordance with the basic method disclosed in the aforementioned U.S. Pat. No. 3,304,356, a mat of fibrous filter material which has been previously impregnated with a thermosetting resin and then dried at a temperature below that at which the curing of the resin commences in inserted by hand or by machine into the slot 10 of each of a pair of forming cylinders 11 onto a rotating mandrel 12, having small projections 12a thereon, within each cylinder 11 (FIG. 6). Rotation of mandrel 12 forms the dried mat into a cylindrical form. An annular piston 13 individual to each mandrel 12 is then actuated, as presently described, to apply axial pressure to the cylindrical form and transfer and compress it into one of a pair of molds 14 mounted on a base 15 which is fixed to the links 16 of an endless conveyor 17 trained over sprockets 18, one of which is driven.

At the transfer station where the filter material is transferred from the forming cylinder 11 to the mold 14, a cover-closing mechanism 19 is provided, as presently described, to close the covers 20 of the pair of molds. The molds are then carried upwardly through a housing 21, the upper end of which forms a heated chamber, and then to an unloading station U where a cover-operating mechanism 22 is actuated to open the covers permitting the release of the cured filter elements from the molds 14.

Figure 4:
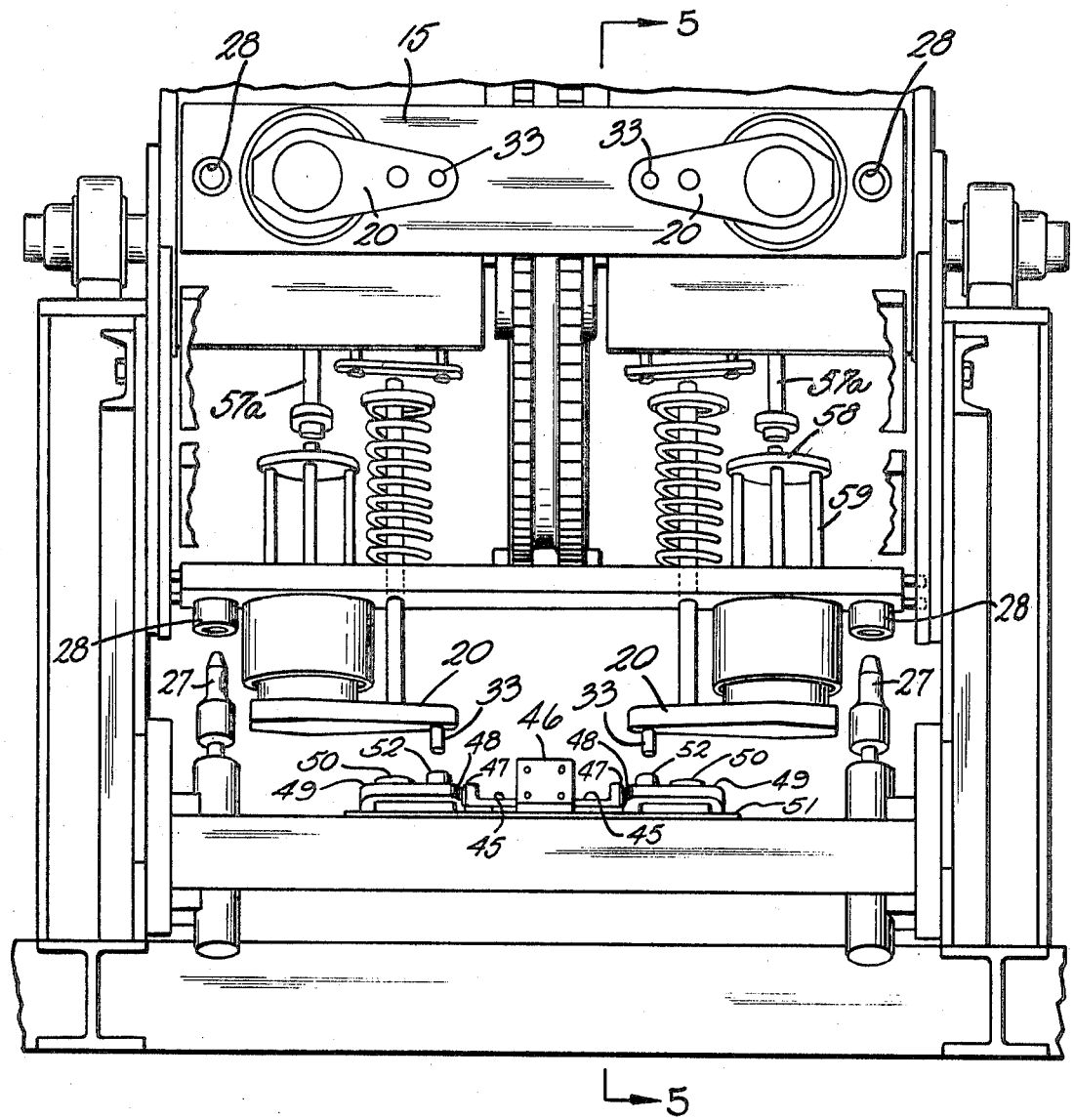
FIG. 4 is a part sectional rear elevational view of the apparatus.

Referring to FIGS. 6-8, a slide 23 supports cylinders 24 which have their pistons 25, in turn supporting rods 26 on the outer end of which the stripping piston 13 is mounted. The mold-closing mechanism 19 is also supported on the slide 23 and includes locating pins 27 that are adapted to engage locating openings 28 on the plate 15 (FIG. 4). A cylinder 29 has its piston rod 30 fixed to the slide 23 so that it will move the slide 23 toward and away from the molds. As a pair of molds is brought into position at the transfer station (FIG. 2), the slide 23 is actuated to cause the locator pins 27 to locate the locator openings 28.

The cylinders 24 are then actuated to move the stripping pistons 13 to the right as viewed in FIGS. 6 and 2 and thereby transfer the previously formed mats from the forming cylinders 11 into the open ends of the molds 14. The cylinders 24 are then actuated to retract the stripping pistons 13.

Figure 5:
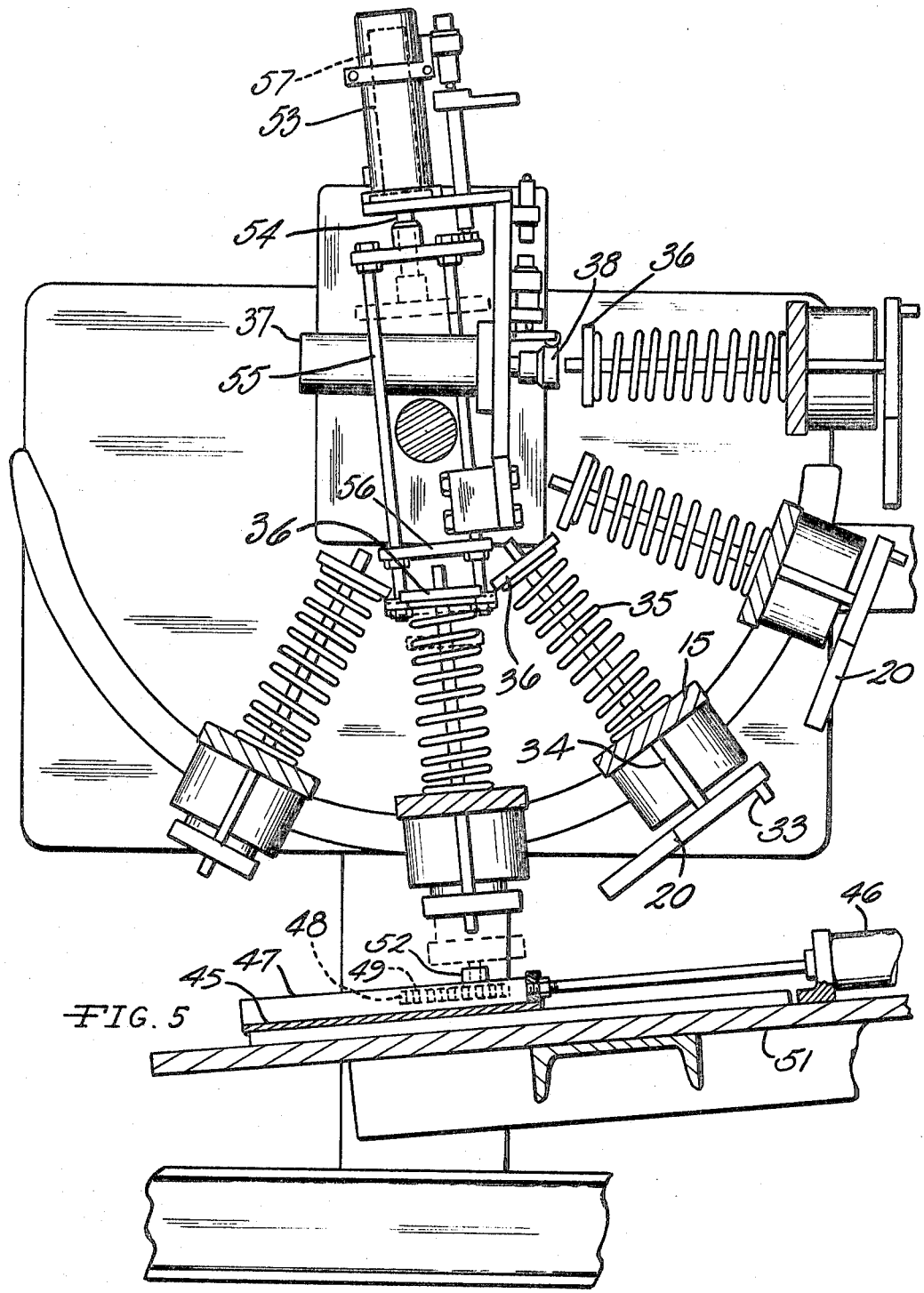
FIG. 5 is a fragmentary sectional view taken along the line 5-5 in FIG. 4.

The mold cover-closing mechanism 19 further includes a pair of levers 31 pivoted on the forward end thereof and having hollow projections 32 that are adapted to engage openings 33 in the covers of the molds. As shown in FIG. 5, each cover 20 is mounted on a rod 34 that extends through the base plate 15 and a spring 35 is interposed between a collar 36 on the rod 34 and the plate 15 to yieldingly urge the cover toward the mold. At the transfer station, a piston motor 37 is provided and actuates a bar 38 to move the collars and in turn the covers 20 axially outwardly to permit rotation of the covers.

As shown in FIGS. 6-8, the levers 31 are fixed to shafts 39 that are rotatably mounted on the plate 23. The shafts are interconnected by links 40, 41, 42 and a piston motor 43 is connected to link 42 so that when the piston motor is actuated the levers 31 and in turn the projections 32 thereon are oscillated to move the covers. After the covers have been moved to mold-closing position, the piston 29 is actuated to retract the slide moving the projections 32 out of engagement with the openings 33 on the mold covers.

At the unloading station U a similar mechanism is provided for opening the covers. As shown in FIGS. 4 and 5, the mechanism comprises a slide 45 that is actuated by a cylinder motor 46. The slide supports racks 47 which are engaged with teeth 48 on plates 49 that are pivoted at 50 to a base plate 51. Each of the plates 51 supports a hollow projection 52 that is adapted to be engaged by the projection 32 of a cover 20.

As shown in FIG. 5, a piston motor 53 has its piston rod 54 supporting actuating rods 55 and a plate 56 which moves the collars 32 and, in turn, the covers 20 outwardly into engagement with the socket members 52. When the covers have been so moved outwardly away from the molds, actuation of the piston motor 46 will rotate the plates 49 to move the covers into position uncovering the mold openings.

After the covers have been moved to a position uncovering the mold openings, a piston motor 57 is actuated to cause a piston rod 57a to engage a plate 58 and move ejector rods 59 to eject cured molded filter elements from the mold. The piston motor 53 is then retracted to release the covers into position out of the mold-closing relation to the molds.

Figure 3:
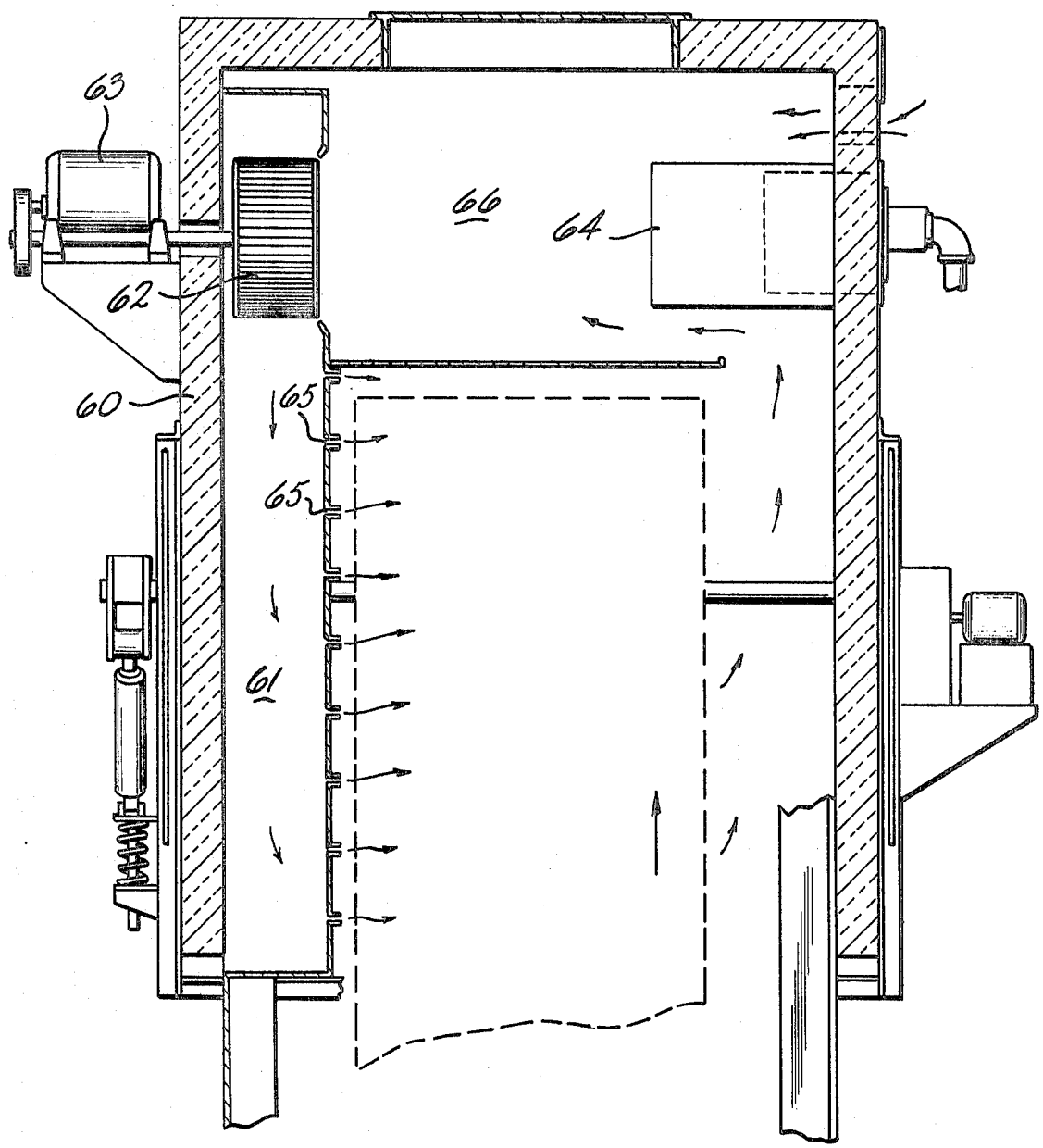
FIG. 3 is a fragmentary sectional view taken along the line 3-3 in FIG. 1.

As shown in FIG. 3, the chamber which surrounds the endless conveyor comprises an insulated housing 60 that has a plenum 61 therein to which heated air is fed by a fan 62 such as a sirocco fan driven by a motor 63. The fan 62 draws air across a heating element 64 and forces it into the plenum 61 after which it is directed horizontally outwardly through slots 65 in the plenum wall. The heated air flows transversely across the molds which are moving upwardly and then upwardly along the side of the chamber to the upper portion 66 of the chamber. The fan operates to continuously circulate the air.

As the molds move through the heated portion of the chamber, heat is transferred to the molds and to the filter material in the molds to cure the resin with which the filter material is impregnated.

I claim:

1. In an apparatus for forming filters, the combination comprising:

a plurality of molds;

each said mold having a tubular cavity and an open end;

each said mold including a cover movable into mold closing position over the open end;

means for supporting each mold cover for movement axially toward and away from said mold, and spring means yieldingly urging said mold cover toward said mold;

means for supporting said molds for movement in a vertically moving endless path;

a filter transfer station at one point along said path;

means at the transfer station operable to move the covers between open and closed position;

means at the transfer station for inserting partially formed tubular filter elements axially in said molds;

a heating chamber positioned at another point along said path;

a discharge station at another point along said path; and means at the discharge station for moving the covers from closed to open position.

2. The combination set forth in claim 1 wherein said means for moving said covers from closed to open position comprises a member pivoted at one point along the path of said molds;
means for operating said member; and
said member having a portion thereof adapted to engage the cover of the mold for moving the cover of the mold.

3. The combination set forth in claim 1 wherein said means for moving said mold covers between open and closed positions comprises means mounted for oscillating movement and interengaging means between said mold cover and said last-mentioned means.

4. In an apparatus for forming filters, combination comprising:
a plurality of pairs of molds;
said molds being supported in vertically spaced pairs;
each pair of said molds including a cover movable into mold-closing position over the open ends of said pair;
means for supporting each mold cover for movement axially toward and away from said mold, and spring means yieldingly urging said mold cover toward said mold;
endless conveyor means for supporting said molds for movement in a vertically moving endless path;
a filter transfer station at one point along said path;
means at the transfer station operable to move the covers of each pair of molds between open and closed position;
a heating chamber positioned at another point along said path;
a discharge station at another point along said path; and
means at the discharge station for moving the covers from closed to open position.

5. The combination set forth in claim 4 wherein said means for moving said covers from closed to open position comprised a pair of members pivoted at one point along the path of said molds;
rack means for operating said members; and
said members having portions thereof adapted to engage the covers of the pair of molds for moving the covers of the molds.

6. The combination set forth in claim 4 including said means for moving said mold covers between open and closed positions comprises means mounted for oscillating movement and interengaging means between said mold covers and said last-mentioned means.

PO-1050
(5/69)

UNITED STATES PATENT OFFICE
CERTIFICATE OF CORRECTION

Patent No. 3,571,847     Dated March 23, 1971

Inventor(s) Robert Palmai

It is certified that error appears in the above-identified patent and that said Letters Patent are hereby corrected as shown below:

On the page containing the Abstract, insert:

-- [73] Assignee   Sheller Globe Corporation--
                        Detroit, Mich.

Signed and sealed this 29th day of June 1971.

(SEAL)
Attest:

EDWARD M. FLETCHER, JR.           WILLIAM E. SCHUYLER, JR.
Attesting Officer                   Commissioner of Patents